United States Patent [19]
Frits

[11] Patent Number: 5,482,501
[45] Date of Patent: Jan. 9, 1996

[54] DEER SKINNING APPARATUS

[76] Inventor: Benjamin D. Frits, 1422 N. Hightower, Stillwater, Okla. 74075

[21] Appl. No.: 434,663

[22] Filed: May 4, 1995

[51] Int. Cl.6 .................................................. A22B 5/16
[52] U.S. Cl. ......................................... 452/125; 452/187
[58] Field of Search .................................. 452/125, 128, 452/132, 187

[56] References Cited

U.S. PATENT DOCUMENTS

| | | | |
|---|---|---|---|
| 3,871,084 | 3/1975 | Carrington et al. | 17/21 |
| 4,317,257 | 3/1982 | Engel | 452/187 |
| 4,529,240 | 7/1985 | Engel | 294/141 |
| 5,336,124 | 8/1994 | Garside | 452/125 |
| 5,336,129 | 8/1994 | Frith | 452/187 |

FOREIGN PATENT DOCUMENTS

| | | | |
|---|---|---|---|
| 249881 | 8/1912 | Germany | 452/125 |
| 634576 | 8/1936 | Germany | 452/125 |

Primary Examiner—Willis Little
Attorney, Agent, or Firm—Head & Johnson

[57] ABSTRACT

An apparatus for removing the skin from an animal carcass. The apparatus comprises a cable, a two stage ball, and a skinner plate. The specially shaped two stage ball has a larger lobe and a relatively smaller lobe and a neck connecting the two lobes. To begin the skinning process, cuts are made in the deer's skin, or hide, and a portion of skin behind the deer's neck is pulled back. The skinner plate is placed on the raw side of the hide. The relatively smaller lobe of the two staged ball is pushed through an aperture in the skinner plate from the hair side of the hide. The cable is then tightened around the neck of the two stage ball, thereby cinching the hide to the two stage ball. A pulling force can then be applied on the cable and the skin peeled from the animal carcass.

14 Claims, 5 Drawing Sheets

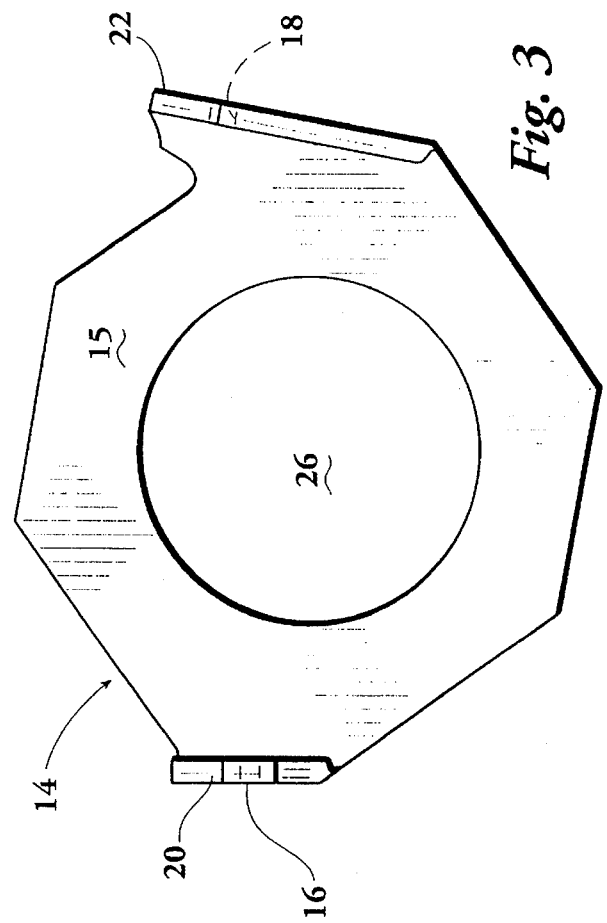
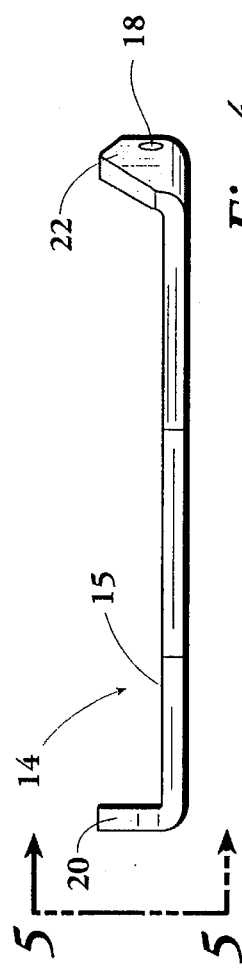
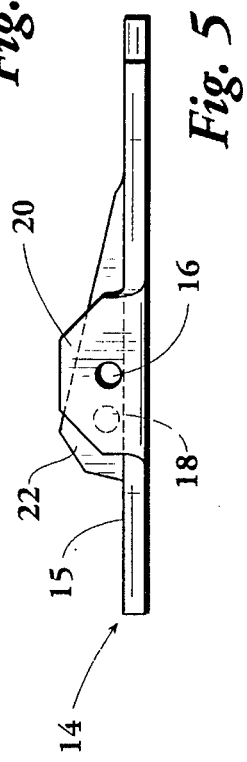
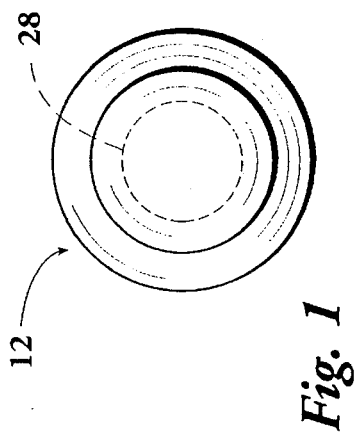
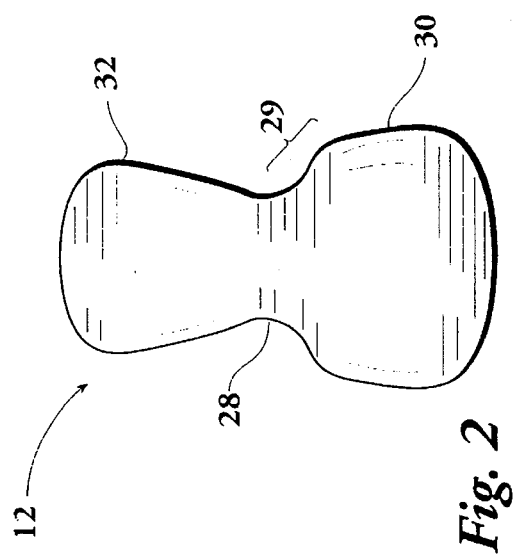

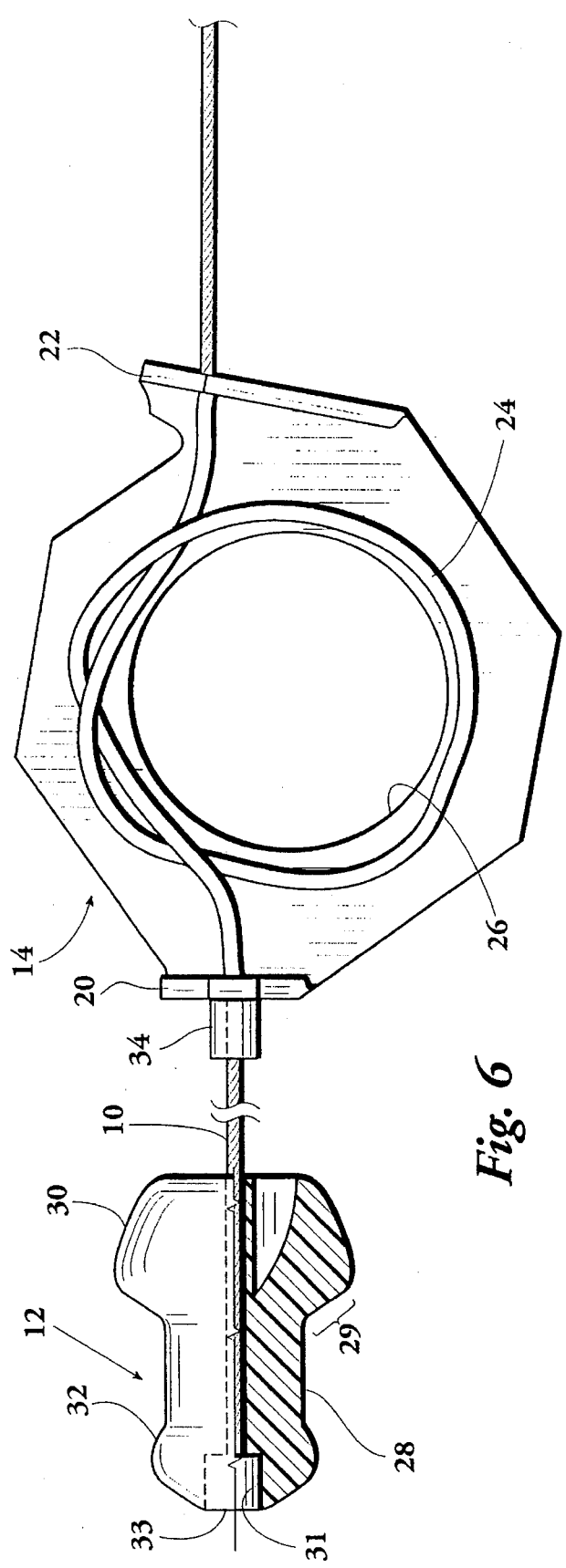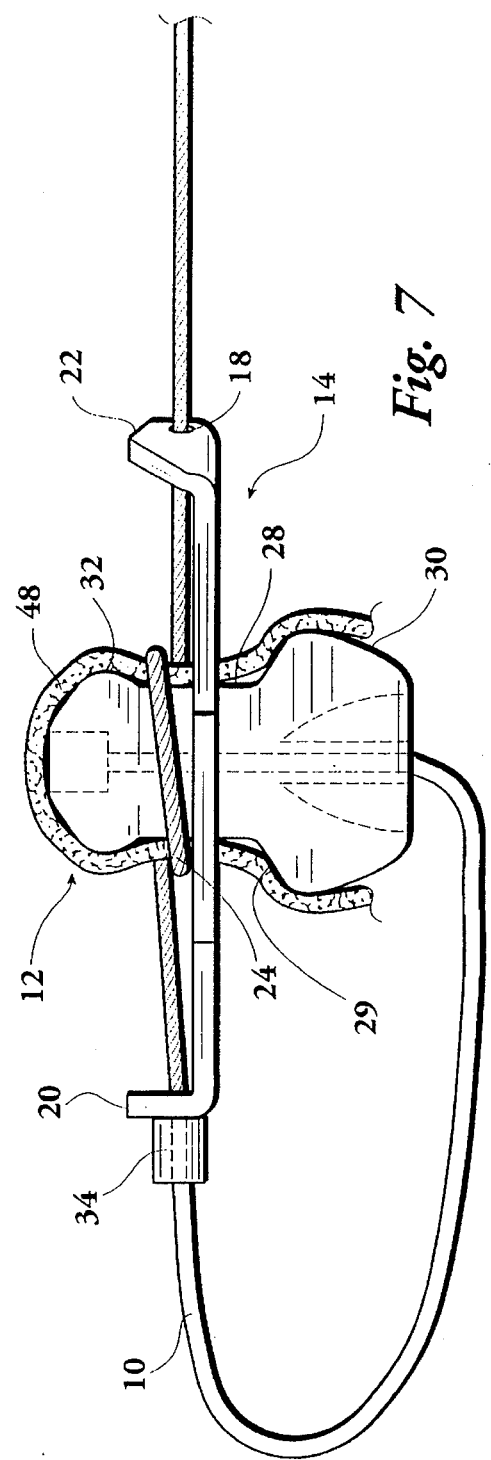

DEER SKINNING APPARATUS

BACKGROUND OF THE INVENTION

1. Field of the Invention

The present invention relates to an apparatus for skinning a game animal, and more particularly relates to an apparatus for removing the skin from an animal quickly and easily in an outdoor environment.

2. Background

When a large game animal, such as a deer, is shot and killed by a hunter in the wild, the hunter must then skin the animal and transport the animal back to the hunter's home. It is desirable that the skinning process take place in a way that does no damage to the animal's head and antlers, since hunters often desire to mount this portion of the animal.

It is well known in the art that the skin of a large game animal can be removed by cutting the skin and removing it by peeling the skin off of the carcass. Various patents have been awarded for devices which more easily facilitate this skinning process. Many of these patents teach that the animal is required to be suspended above the ground. Many of these patents require cuts to be made in the animal's skin and a rope or cable to be attached to the skin behind the animal's neck. The skin is then peeled away from the animal by applying a pulling force on the rope or cable.

U.S. Pat. No. 3,871,084 to Carrington teaches a Deer Skinning Apparatus and Method of Using Same which utilizes this technique. U.S. Pat. Nos. 4,317,257 and 4,529,220 to Engel also disclose similar techniques for skinning an animal.

The Carrington patent teaches a means for attaching a rope to the animal's skin. The rope is fed through a hole in an anchor block then back through a second hole in the anchor block where it is then knotted so that it is secured thereto. A stop clip is provided to maintain the position of the rope once it is fed through the anchor block. Repeated application and removal of the stop clip will cause wear on a localized area of the rope, subjecting the rope to premature breakage when a pulling force is applied. Finally, the application of force necessary to remove the skin from the animal is applied directly to the skin that is stretched tightly over the anchor block. This results in unnecessary deformation of the skin of the animal. Similarly, the Engel patents teach placing a rock or other irregular object behind the animal's skin to form a pouch as an attachment point for a rope or cable. The skin is cinched adjacent to the object and is stretched around it.

U.S. Pat. No. 5,336,124 to Garside teaches a Horizontal Skinning and Protection Apparatus. The Garside patent also teaches a method for removing the skin from a game animal. The Garside patent does not require that the animal has to be suspended above the ground. Instead Garside teaches that the game animal should be placed horizontally on a tarp and that the animal's head should be secured to an immovable object. The skin is then peeled from the animal by means of a vehicle attached thereto by a cable. The attachment means is a cable that is run through a curved hollow cylinder. The cable extends through the cylinder and loops back into the cylinder. The looped cable is then used to secure a portion of skin that is subsequently drawn towards the cylinder and that is penetrated by a cylindrical spike that is supplied thereon. A difficulty with the Garside device is that the attachment means is unnecessarily bulky and complex, and is therefore unnecessarily heavy and expensive.

SUMMARY OF THE INVENTION

It is therefore an object of the invention to provide a method for removal of skin from a game animal without requiring that the animal be suspended vertically above the ground.

A further object of the invention is to provide a simple and inexpensive means for attaching a cable to the skin of an animal so that the skin can be removed simply and easily.

More particularly, the apparatus of the present invention for removing skin from an animal carcass consists of a cable, a two stage ball, and a skinner plate for securing and guiding the cable. The two stage ball of the invention is an object, preferably constructed of plastic, that possesses a large lobe connected by a neck to a relatively smaller lobe.

To begin the skinning process, cuts are placed in the skin of the animal in a manner well known in the deer skinning art. The skinner plate is placed on the raw side of the hide. The relatively smaller lobe of the two stage ball is pushed through the aperture in the skinner plate from the hair side of the animal's hide. The cable is then tightened around the neck of the two stage ball. The cable cinches around that portion of deer skin around the neck of the two stage ball so that the cable is securely attached to the skin. The skinner plate of the invention is preferably constructed of metal, and preferably has a pair of spaced tabs each having a hole to receive the cable. A crimped stop or ferrule is placed on the cable so as to abut one of the spaced tabs and prohibit the cable from pulling through the tab.

In practice, after the skin of the animal has been cut, the two stage ball is inserted in a pouch of skin behind the neck of the animal with the smaller lobe of the two stage ball projecting upward so that when the skin is pulled off of the animal's carcass, the larger lobe of the two stage ball prevents the two staged ball from being pushed through the hole in the skinner plate. The skinner plate is placed around the pouch of skin. A loop is formed in the cable such that the loop is essentially parallel to the skinner plate and concentric with the hole therein. The cable is then cinched down against the neck of the two stage ball by grasping the plate and pulling on the cable. The other end of the cable is attached to a vehicle that applies a pulling force that peels the skin off of the animal. A second cable is used to secure the head of the animal to an immovable object so that the animal remains stationary when the pulling force is applied.

BRIEF DESCRIPTION OF THE DRAWINGS

FIG. 1 is a top view of the two stage ball.

FIG. 2 is a side elevation view of the two stage ball.

FIG. 3 is a top view of the skinner plate.

FIG. 4 is an elevation view of the skinner plate with a substantially end view of the tabs.

FIG. 5 is an elevation view of the skinner plate taken along the line 5—5 of FIG. 4.

FIG. 6 is a top plan view of the skinner plate shown with the looped cable passing through the tabs of the skinner plate.

FIG. 7 is a side elevation view of the skinner plate showing the cable passing through the tabs and cinching the animal hide against the two stage ball.

DETAILED DESCRIPTION OF THE PREFERRED EMBODIMENTS

Figure 8:
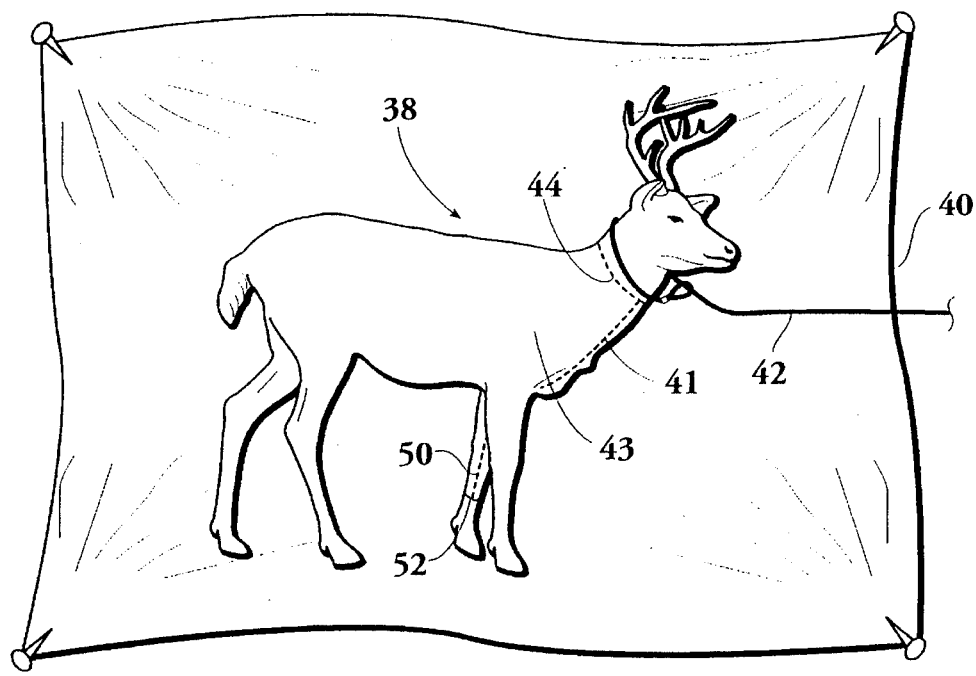
FIG. 8 is a top plan view showing a deer in the initial preparation stage.

Referring to FIGS. 1–7, the apparatus for removing skin from an animal carcass of the present invention comprises a cable 10, two stage ball 12, and skinner plate 14. Cable 10 passes through holes 16 and 18 formed in tabs 20 and 22 which are formed on skinner plate 14. The cable is formed into loop 24 and is positioned around aperture 26 formed in skinner plate 14. Loop 24 is then placed around the neck 28 of two stage ball 12. Surface 29 must be enveloped by the animal's skin so that the skin will not slip off of the two staged ball 12. Neck 28 and surface 29 are located between larger lobe 30 and relatively smaller lobe 32. The preferred embodiment of two stage ball 12 possess recessed area 31 for receiving crimped stop 33. Crimped stop 33 is affixed to cable 10 and maintains two stage ball 12 on cable 10. The relative size of aperture 26 and larger lobe 30 is critical. Once the animal's hide envelopes the two stage ball 12, the larger lobe 30 must be of a size sufficient to resist pulling through aperture 26. In the preferred embodiment, the diameter of aperture 26 is 1⅞". The outside diameter of the large lobe is preferably 1½". The thickness of a deer's hide is typically about ¼". When the hide surrounds the two stage ball 12, the surrounding hide adds approximately ½" to larger lobe 30's diameter, thereby preventing two stage ball 12 from pulling through aperture 26. Cable 10 also has crimped stop 34 positioned thereon that abuts tab 20 and prevents cable 10 from pulling through tab 20. Crimped stop 34 assures that loop 24 tightly surrounds neck 28 of two stage ball 12. A pull on the cable 10 will hand tighten loop 24 of cable 10 around neck 28 of two stage ball 12 before a pulling force is applied to the opposite end of cable 10. Tabs 20 and 22 are oriented on skinner plate 14 so that loop 24 lays substantially flat against skinner plate 14. The positioning of loop 24 in this manner allows the user to more easily surround two stage ball 12 with cable 10.

As shown in FIGS. 3, 4, and 5, skinner plate 14 includes a basic flat plate 15 with tabs 20 and 22 having aligned holes 16 and 18 for the cable 10 as described. The shape of the plate is basically immaterial except that provision is made for spaced substantially aligned cable holes such as 16 and 18. Having the openings substantially aligned provides a substantially in-line pulling force to the cable when in use as described hereinafter in more detail.

Figure 9:
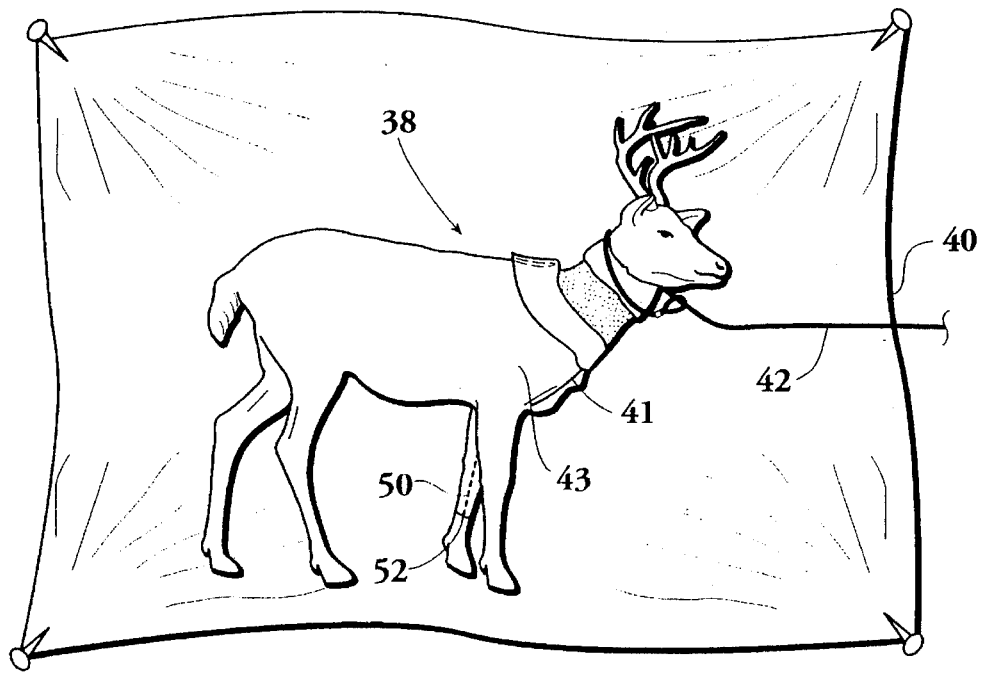
FIG. 9 is a top plan view showing the next stage of preparation for removing the skin.
Figure 10:
FIG. 10 shows the next stage with the two stage ball and skinner plate in position ready for the pulling operation.
Figure 11:
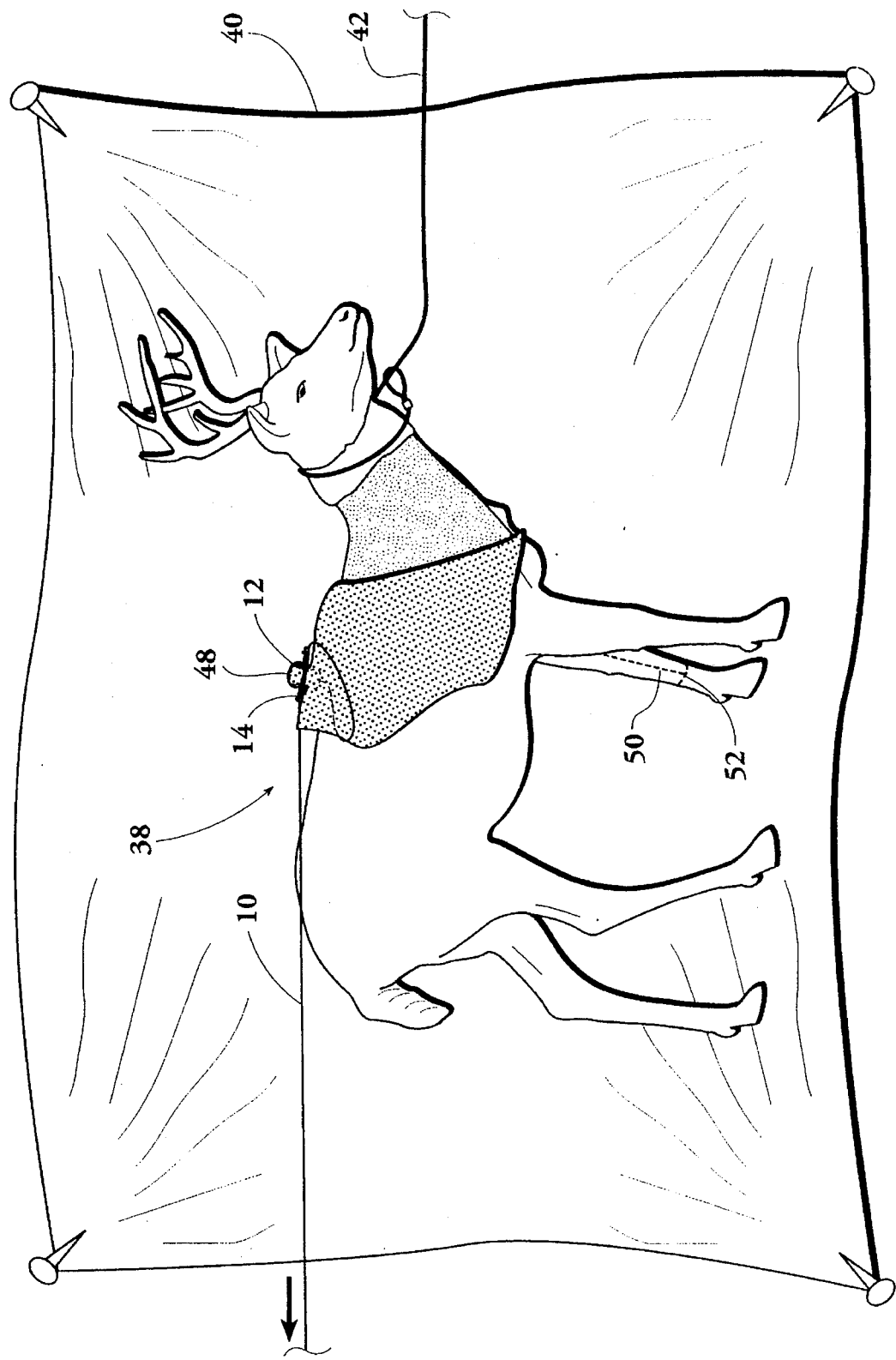
FIG. 11 shows the beginning of the skinning operation.

In practice, deer 38 is laid upon a tarp 40 and second cable 42 is secured around the head of deer 38 and attached to a tree or post or other fixed object. The skin of deer 38 is then cut for field dressing in a manner that is well-known in the art. The skin cut 41 on the deer, shown dotted, is extended from the top of brisket 43 to approximately 12 inches from the head. Perpendicular to this cut, second cut 44 is made around the deer's neck. During the cutting phase it is important to cut skin only and not cut the meat. As shown in FIG. 9, the skin is then pulled back from second cut 44, which surrounds the neck of the deer. After the skin is pulled back, an area of loose skin 46 is formed and turned back. The skinner plate 14 is placed on the raw side of the hide. The relatively smaller lobe 32 of the two stage ball 12 is pushed through aperture 26 in skinner plate 14. The cable 10 is then tightened around neck 28 of two stage ball 12, thereby cinching the hide 48 to two stage ball 12. The invention provides a means to secure the cable to the skin so that the skin can be removed by applying a pulling force to cable 10, as shown in FIG. 11.

When utilizing two stage ball 12 for removal of the hide, loose skin 46 must cover at least surface 29 of smaller lobe 32 of the two stage ball 12 prior to positioning loop 24 of the cable 10 around it.

To facilitate easy removal of the skin, a cut 50 must be made on the skin on each front leg from the knee joint to the brisket. A second cut 52 should be at a right angle around the knee joint.

The free end of cable 10 should then be placed on a ball hitch of a movable vehicle. The second cable 42 should secure the head of the animal to an immovable object. All cables now in place should be tightly secured between an immovable object, deer 38, and the vehicle. At this time, any further slack should be removed from cable 10 by pulling the vehicle forward slowly. A person should stand off to the side of the deer to signal the driver. The vehicle should be slowly advanced until skin 46 is removed to the deer's tail. At this time the vehicle should be stopped and an index finger and thumb should be inserted around the tail of the deer to push skin off of the tail. The vehicle should be further advanced until the skin is removed passed the deer's knees of its rear legs. At this time the skin should be cut around each back leg between the knee and the ankle joint. The truck may then be advanced again to completely remove the skin from the deer.

Whereas, the present invention has been described in relation to the drawings attached hereto, it should be understood that other and further modifications, apart from those shown or suggested herein, may be made within the spirit and scope of this invention.

What is claimed is:

1. Apparatus for removing skin from an animal carcass, comprising:

a cable having a fixed end and a pulling end;

a two stage ball having upper and lower lobes for inserting in a pouch formed by loose skin of the animal, said two stage ball lobes being spaced to define a neck region therebetween;

a skinner plate having an opening sized to receive said upper lobe and surrounding said pouch and ball in said neck region, said plate being connected to said cable;

said cable having a loop that wraps around said pouch and said two stage ball in said neck region, said cable arranged so that it is adjacent to said neck region of said two stage ball prior to being pulled at said pulling end;

a skinner plate having an opening which surrounds said pouch, said plate being connected to said cable.

2. The apparatus of claim 1 wherein said two stage ball comprises:

a large lower lobe; and a relatively smaller upper lobe.

3. The apparatus of claim 1 wherein said two stage ball is made of plastic.

4. The apparatus of claim 3 wherein said two stage ball is made of polyethylene.

5. The apparatus of claim 3 wherein said two stage ball is made of fiberglass.

6. The apparatus of claim 1 wherein said two stage ball is made of metal.

7. The apparatus of claim 2 wherein said skinner plate comprises:

a metallic piece, said opening therein of a size sufficient to be placed over said smaller lobe, yet smaller than the formed pouch about said larger lobe.

8. The apparatus of claim 2 wherein said skinner plate comprises:

a fiberglass piece, said opening of a size sufficient to be placed over said smaller lobe and pouch, yet smaller than the formed pouch about said larger lobe.

9. The apparatus of claim 7 wherein said skinner plate further comprises a pair of spaced tabs, one toward said fixed end and one toward the pulling end, each having substantially coaxial holes formed therein for receiving said cable.

10. The apparatus of claim 9 wherein said skinner plate further comprises means to retain said cable against said tab of said fixed end.

11. The apparatus of claim 1 wherein said cable is wire rope.

12. The apparatus of claim 10 wherein said means to retain said cable comprises a ferrule to prevent said cable from slipping through said hole in said tab.

13. Apparatus for removing skin from an animal carcass, comprising:

a cable having a fixed end and a pulling end;

a two stage ball for inserting in a pouch formed by loose skin of the animal, said two stage ball having a large lower lobe and a relatively smaller upper lobe;

said cable having a loop that wraps around said pouch and said two stage ball, said cable arranged so that it is adjacent to an area between said large lower lobe and said relatively smaller upper lobe of said two stage ball; and a skinner plate having an opening which surrounds said pouch and said two stage ball, said opening of a size sufficient to be placed over said smaller lobe and said pouch when said smaller lobe is inserted in said pouch, yet said opening of a size smaller than said formed pouch surrounding said larger lobe; and said plate further comprising a pair of spaced tabs, one toward said pulling end of said cable, each having substantially coaxial holes formed therein for receiving said cable.

14. A method of removing skin from an animal carcass, comprising:

cutting the skin of said animal carcass;

inserting a two stage ball in a pouch formed by loose skin of the animal, said two stage ball having a neck between two spaced lobes;

placing a skinner plate having an opening for receiving said pouch around said pouch;

looping a fixed end of a cable around said pouch and said two stage ball above said plate, said cable surrounding said neck of said two stage ball;

securing a pulling end of said cable to a movable object; and advancing said movable object away from said animal so that said skin of said animal is peeled from said carcass.

* * * * *